July 25, 1939.　　　W. F. ECKERT　　　2,167,065
TRANSMISSION CASING FOR INTERNAL COMBUSTION ENGINE LOCOMOTIVES
Original Filed Nov. 28, 1936　　4 Sheets-Sheet 1

INVENTOR
WM. F. ECKERT
BY
ATTORNEY

July 25, 1939.   W. F. ECKERT   2,167,065
TRANSMISSION CASING FOR INTERNAL COMBUSTION ENGINE LOCOMOTIVES
Original Filed Nov. 28, 1936   4 Sheets-Sheet 3

INVENTOR
WM. F. ECKERT
BY
ATTORNEY

July 25, 1939.  W. F. ECKERT  2,167,065
TRANSMISSION CASING FOR INTERNAL COMBUSTION ENGINE LOCOMOTIVES
Original Filed Nov. 28, 1936   4 Sheets-Sheet 4

INVENTOR
WM. F. ECKERT
BY
ATTORNEY

Patented July 25, 1939

2,167,065

UNITED STATES PATENT OFFICE 2,167,065

TRANSMISSION CASING FOR INTERNAL COMBUSTION ENGINE LOCOMOTIVES

William F. Eckert, Ridley Park, Pa.

Original application November 28, 1936, Serial No. 113,126. Divided and this application May 27, 1938, Serial No. 210,439

7 Claims. (Cl. 74—606)

This invention relates generally to change speed gear transmissions adapted especially for internal combustion engine locomotives and relates more particularly to an improved structure such as a transmission casing for supporting and housing the gears and shafts. This application is a division of my application, Serial No. 113,126, filed November 28, 1936.

It is well known that mechanical transmission of power from an engine to the locomotive wheels through the medium of a change speed gear transmission is one of the most difficult problems that designers of small capacity locomotives have been confronted with, especially when it is attempted to provide a low cost transmission that is compact and sturdy and can be readily mounted in the frame of a locomotive with its inherent narrow width but without restricting the accessibility of the transmission for purposes of inspection or repair. Many attempts have been made to design transmissions that will meet the foregoing conditions, but such designs have been deficient in that they require excessive space, are not conveniently accessible when either removed from or assembled with the locomotive or are too costly or inefficient.

It is an object of my invention to provide an improved combination and arrangement of elements in a casing for supporting and housing transmission gears and shafts and for effectively supporting such a casing by the locomotive frame. Another object is to provide an improved casing that is extremely compact and sturdy as well as providing a rugged and effective supporting relation with the locomotive frame, all of which is obtained with a high degree of accessibility to the transmission.

Other objects and advantages will be more apparent to those skilled in the art from the following description of the accompanying drawings in which.

Figure 1:
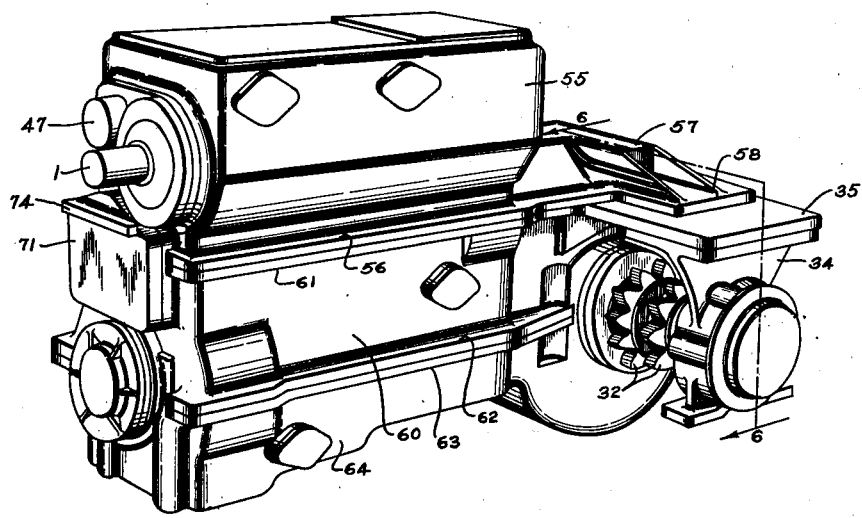
Fig. 1 is a perspective of the complete transmission viewed from the driven end.
Figure 2:
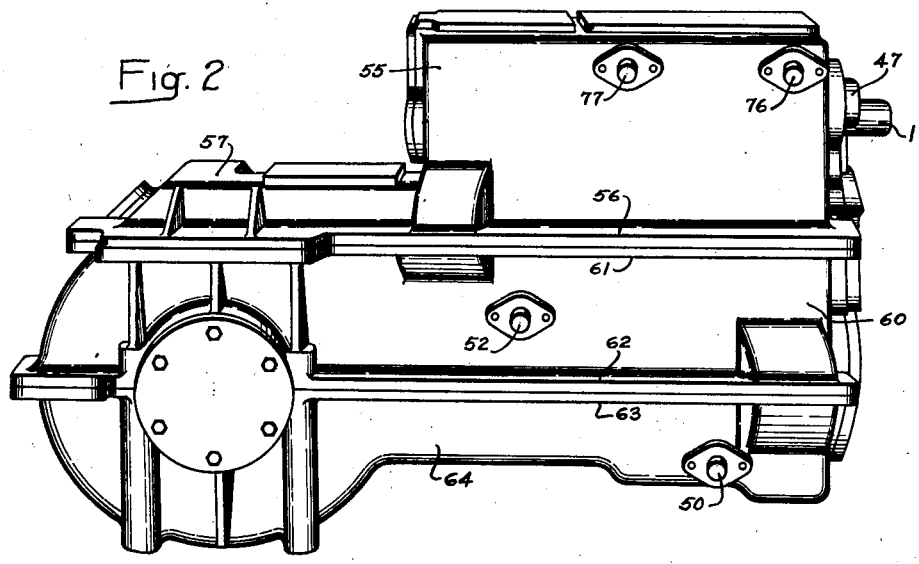
Fig. 2 is a perspective of the complete transmission viewed from the opposite side of Fig. 1.

In the particular embodiment of the invention, such as is shown herein merely for the purpose of illustrating one specific form among possible others that the invention might take in practice, I have shown one specific arrangement of gears and shafts in order to set forth clearly the casing structure and its advantages. A driving shaft 1 (Fig. 5) is adapted for connection either directly or through a clutch to the drive shaft of an internal combustion engine or other suitable prime mover. This shaft is journalled in suitably held bearings generally indicated at 2 and 3, it being noted that bearing 3 is mounted in a support 4 depending from the top of the gear housing generally indicated at 5. Rotatably journalled on shaft 1 is a reverse driving pinion 6 and a forward driving pinion 7 adapted alternatively to be clutched to shaft 1 through suitable gear type clutch rings 8 and 9 whose internal teeth are complemental to, and respectively receive, the teeth of gears 6 and 7. The clutches are suitably splined to shaft 1. Inasmuch as the general and detailed structure of the transmission can be more briefly and clearly described in connection with the various gear speeds, the latter will be taken up in order.

Figure 3:
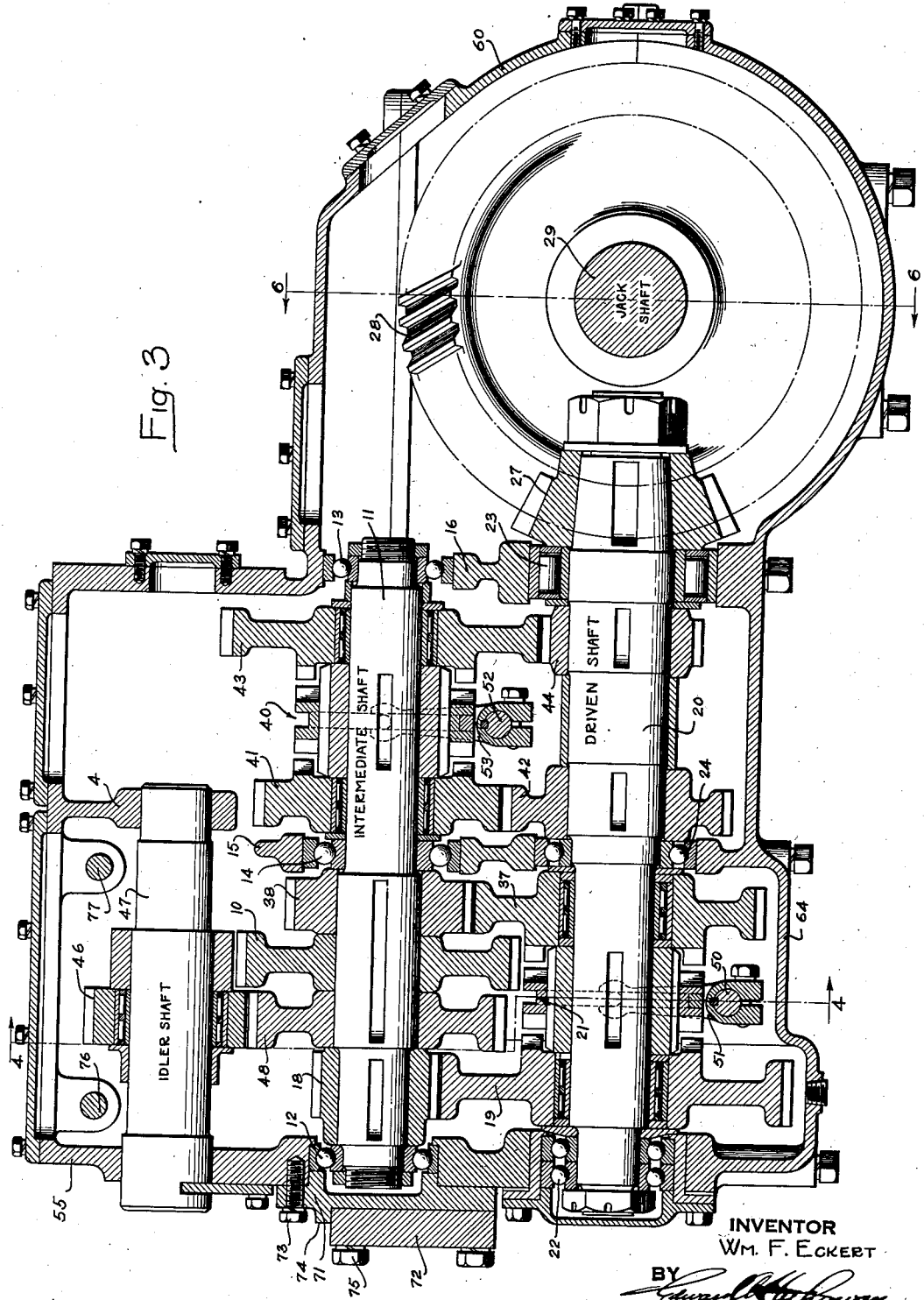
Fig. 3 is a vertical longitudinal section taken substantially on the line 3—3 of Fig. 4.
Figure 4:
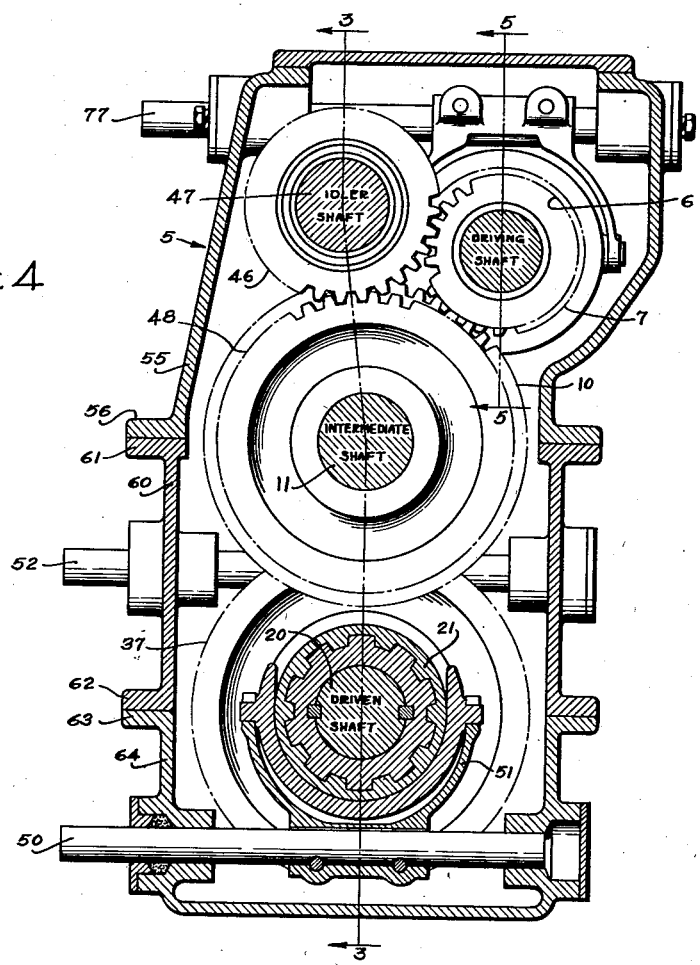
Fig. 4 is a transverse section taken on the line 4—4 of Fig. 3.
Figure 6:
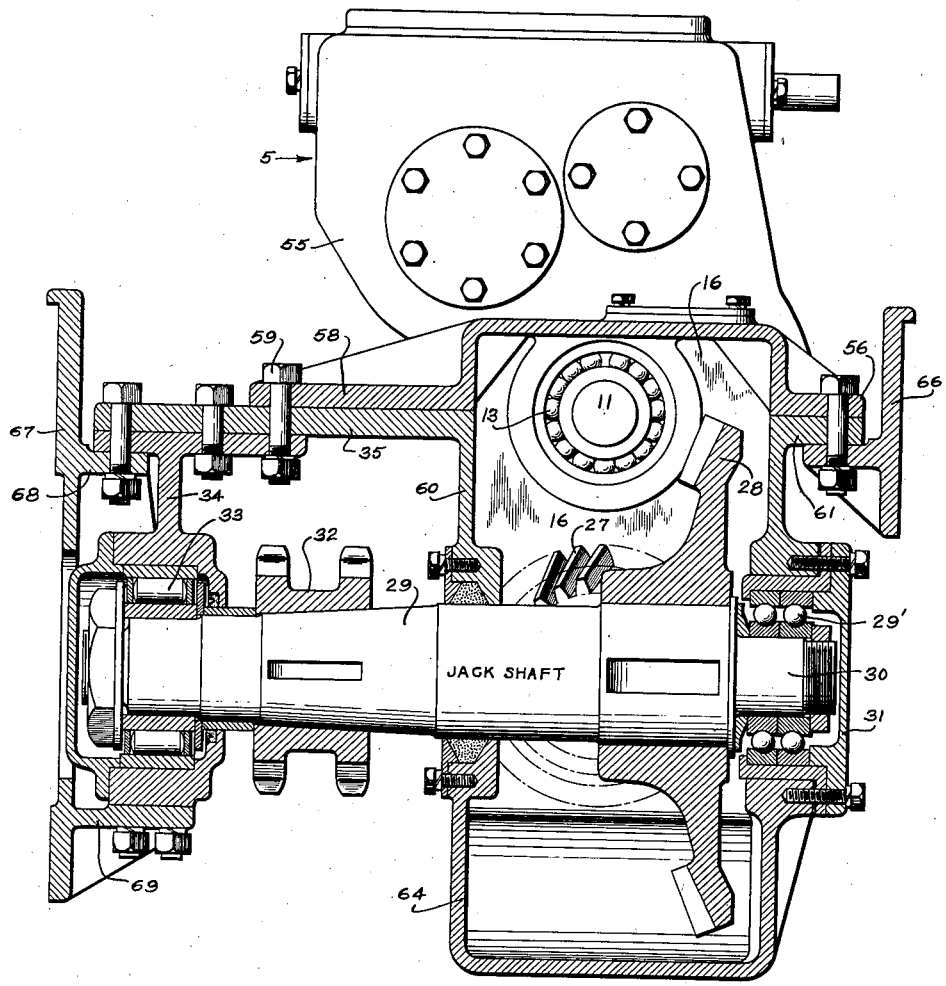
Fig. 6 is a vertical transverse section taken on the line 6—6 of Figs. 3 and 1.

*First speed forward.*—Driving pinion 7 as shown in Fig. 4 meshes directly with an initial driving gear 10 which as shown in Fig. 3 is keyed to an intermediate driving shaft 11. This shaft is journalled at its ends in bearings 12 and 13 and at the intermediate point by a bearing 14, a suitable partition or vertical wall 15 being provided to support bearing 14 while another vertical wall 16 supports bearing 13. Shaft 11 transmits its power through a pinion 18 meshing with a gear 19 which is freely journalled on a third shaft 20 herein referred to as the driven shaft. Gear 19 is adapted to be connected to shaft 20 through a usual shiftable clutch generally indicated at 21. Shaft 20 is journalled in end bearings 22 and 23 and in intermediate bearing 24, bearings 23 and 24 being supported in the vertical walls 15 and 16. Shaft 20 drives a bevel pinion 27 meshing with a bevel gear 28 which is secured to a main transverse jackshaft 29 located to the rear of the transmission. This jackshaft as shown in Fig. 6 is peculiarly arranged so that bevel gear 28 is located at the inner heavy end of the shaft adjacent to which a large capacity frictionless bearing 29' is located upon a reduced stub portion 30 of the jackshaft. A cover 31 holds the bearing in position and is of such size as to permit removal of the jackshaft through the opening closed by the cover. The other end of the jackshaft projects outwardly through one side of the gear case and a sprocket 32 is keyed to the shaft.

The outer end of the jackshaft is journalled in a bearing 33 supported in a dependent bracket 34 which is preferably bolted or otherwise suitably secured to a horizontal shelf bracket 35 formed with the gear case. Any suitable driving chain or chains connect sprockets 32 with the driving axle of the locomotive in a manner that is well known in the art.

*Second speed forward.*—This is obtained by disengaging clutch 21 from gear 19 and engaging clutch 21 with gear 37 which is journalled upon the main shaft 20. Power thereupon flows from shaft 1 through gear 7, Fig. 4, to gear 10, shaft 11, pinion 38 keyed to shaft 11 and thence to gear 37 meshing with pinion 38, shaft 20 and bevel gears 27 and 28 to jackshaft 29.

*Third speed forward.*—Clutch 21 is placed in neutral and a clutch 40 is shifted to the left to connect a gear 41 to shaft 11, this gear otherwise being freely rotatably journalled on said shaft. Power is thereupon transmitted from the engine propelled shaft 1, Fig. 4, through gears 7 and 10, thence through shaft 11, Fig. 3, gear 41 and a gear 42 meshing therewith and keyed to shaft 20 to drive the bevel pinions 27 and 28 and jackshaft 29.

*Fourth speed forward.*—Clutch 40 is engaged with a gear 43 normally freely journalled on shaft 11 thereby to cause power to be propelled from the engine driven shaft 1 through gears 7 and 10, shaft 11, gear 43 meshing with a gear 44 keyed to shaft 20 and thence through shaft 20 to the bevel gears and jackshaft 29.

Figure 5:
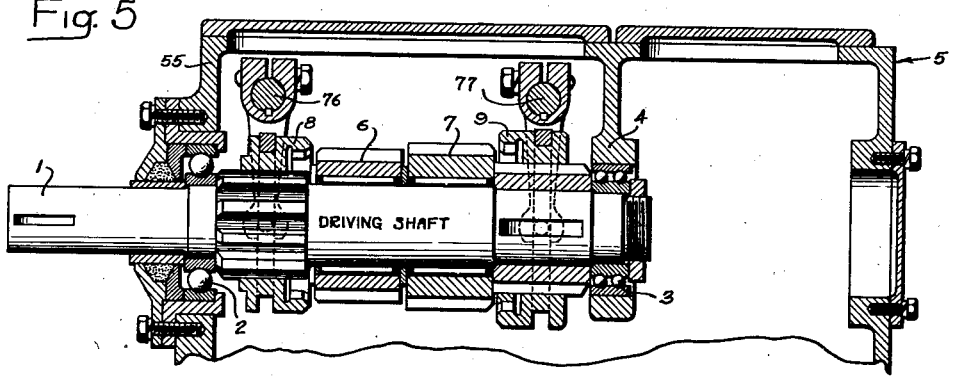
Fig. 5 is a vertical longitudinal section taken on the line 5—5 of Fig. 4.

*First speed reverse.*—Forward speed clutch 9, Fig. 5, is disengaged and reverse clutch 8 is engaged with gear 6 which as shown in Fig. 4 meshes with a gear 46. This gear 46 as shown in Figs. 3 and 4 is normally freely journalled on a reverse idler shaft 47. This shaft as shown in Fig. 4 is located to one side of and substantially parallel to engine driven shaft 1 and is suitably journalled in the casing including dependent bearing support 4. Gear 6 drives gears 46 to in turn transmit power through a gear 48 meshing therewith and keyed to shaft 11 from which the power is transmitted through any one of the four speeds heretofore described merely by shifting the clutches 21 or 40 to their selected positions.

From the foregoing disclosure of the several gear trains, it is seen that an extremely compact, simple and yet highly rugged change speed gear transmission is provided. For example, gears 10 and 48 are located between gears 19 and 37 whereby it is possible to take advantage of this spacing to provide for clutch 21. Due to the relative size of the set of gears 10 and 48 as compared to the set of gears 19 and 37, it is seen that the gears 10 and 48 are adapted to have their peripheries lie in relatively close relation to clutch 21 while the clutch shifting mechanism including the transverse shaft 50 and shipper yoke 51 are adapted to be disposed beneath clutch 21 without in any way enlarging the transmission case to house the same. Similarly the size of the gears 41 and 43 compared to the gears 44 and 42 permits a clutch shipper mechanism including a transverse shaft 52 and shipper yoke 53 to be compactly located beneath clutch 40. This arrangement is in combination with providing ample end and intermediate bearing supports for the second and third shafts 11 and 20 respectively while the arrangement of the change speed gears together with the bevel gears 27 and 28 is such that a gear case of minimum weight may be provided.

*Casing.*—As shown in Fig. 1, the engine driven shaft 1 and idler shaft 47 are located in a gear case section 55 having its lower edge provided with a flange 56 while the rearmost portion of said case terminates in a bevel gear cover portion 57. This cover portion also extends laterally as at 58, Figs. 1 and 6, to reinforce the horizontal shelf bracket 35 and also preferably to overlie a portion of the bracket 34 so that all three members may be commonly connected by a bolt 59. An intermediate gear case section generally indicated at 60 has an upper flange 61 mating with a flange 56 to be secured thereto by bolts while mating flanges 62 and 63 are formed respectively on the lower edge of section 60 and on the upper edge of a lower gear case section 64 to be bolted together in any usual manner. The flanges 56 and 61 lie in the plane of the axis of shaft 11 while flanges 62 and 63 lie in the plane of the axis of shafts 20 and 29.

It is also seen from the disclosure herein that the jackshaft end of the transmission may be rigidly connected to the locomotive frame through any supplemental brackets such as 66 secured to the underside of flanges 56 and 61 while a bracket 67 is provided with flanges 68 and 69 bolted to the under side of shelf 35 and to the lower end of bearing bracket 34. To support the front end of the transmission, I provide a plate 71 performing the dual functions of a cover for bearing 12 and a support for any suitable transverse frame supporting member diagrammatically indicated at 72, Fig. 3. The plate is secured to the gear case by bolts 73 while the cover has a flange 74 supported on frame member 72 which in turn is secured to the gear case by bolts 75.

Thus it is seen that this general arrangement permits the main body of a gear transmission to be located in such a horizontal plane that a minimum portion thereof, such as the upper gear case section 55, projects into the cab portion of the locomotive. Hence minimum space is required combined with maximum adaptability for connecting gear shift levers to the ends of the clutch shifting shafts 50, 52 and to the forward and reverse clutch shifting shafts 76 and 77, Fig. 5.

It will of course be understood that various changes in details of construction and arrangement of parts may be made by those skilled in the art without departing from the spirit of the invention as set forth in the appended claims.

I claim:

1. A gear transmission comprising, in combination, a driving shaft, an intermediate shaft, a third shaft and a transverse bevel gear jackshaft, gearing connecting said shafts for driving the same, and a gear case having lower, intermediate and upper sections separable along planes substantially containing the axes of said intermediate and third shafts, said lower and intermediate sections having a rearwardly projecting portion which provides a housing for said jackshaft and bevel gear thereon, and the upper section having a rearwardly projecting cover for said bevel gear housing.

2. The combination set forth in claim 1 further characterized by the provision of a bearing supported between adjacent sections with the bearing axis substantially in the plane which separates said adjacent sections, a cover for said bearing supported by said adjacent sections, and means associated with said cover to provide a frame engaging portion for supporting the transmission casing.

3. The combination set forth in claim 1 further characterized by the provision of an intermediate shaft bearing located at one end of said housing between adjacent sections thereof and with the bearing axis lying substantially in the separable plane between said adjacent sections, a cover for said bearing, and a horizontal flange formed with said cover and projecting outwardly therefrom to provide a frame supporting connection for the casing.

4. The combination set forth in claim 1 further characterized by the provision of an intermediate shaft bearing located at one end of said housing between adjacent sections thereof and with the bearing axis lying substantially in the separable plane between said adjacent sections, a cover for said bearing, and a horizontal flange formed with said cover and located at the upper portion thereof above the axis of said bearing to provide a frame engaging portion for supporting the transmission casing.

5. A gear transmission comprising, in combination, a housing having lower, intermediate and upper sections separable along horizontal planes, said lower and intermediate sections having a rearwardly extending portion terminating in a transverse jackshaft casing portion, said upper section extending above the plane of the uppermost surface of said rearwardly extended housing portion, a longitudinally extending driving shaft mounted in said upper section, and longitudinally extending driven shafts associated with said lower and intermediate sections.

6. A gear transmission comprising, in combination, a transmission housing having lower, intermediate and upper sections connected to each other along horizontal separable planes, said lower and intermediate sections projecting rearwardly from said upper section to provide a housing portion for a transversely disposed jackshaft which projects laterally through one side of said lower and intermediate sections, a laterally extending flange associated with said lower and intermediate sections adjacent said jackshaft, and a bracket dependently supported by said lateral flange to provide a journal for the outermost end of the jackshaft.

7. The combination set forth in claim 6 further characterized by the provision of a frame supporting member secured to said lateral flange and to the under side of said dependent journal bracket.

WILLIAM F. ECKERT.